Dec. 23, 1947.   S. E. WEINTHAL ET AL   2,433,078
GAUGE FOR SCREW THREAD ROLLING
Filed June 6, 1945
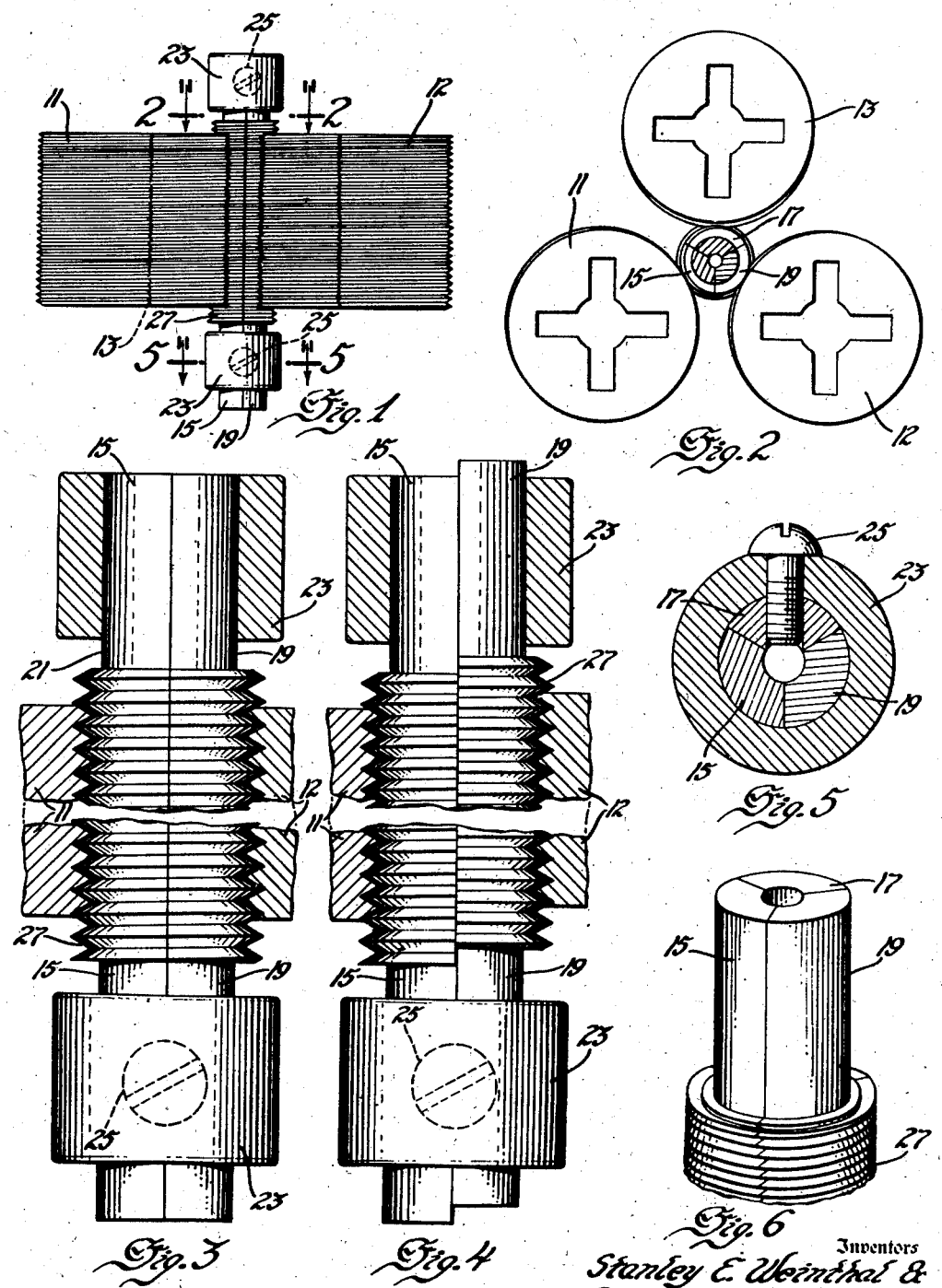
Inventors
Stanley E. Weinthal &
Ernest T. Beitcher Patented Dec. 23, 1947

2,433,078

UNITED STATES PATENT OFFICE 2,433,078

GAUGE FOR SCREW-THREAD ROLLING

Stanley E. Weinthal and Ernest T. Britcher, Flint, Mich., assignors to General Motors Corporation, Detroit, Mich., a corporation of Delaware Application June 6, 1945, Serial No. 597,724

5 Claims. (Cl. 33—182)

Some machines for rolling threads use a plurality of cylindrical rollers arranged in triangular relation and rotatable in unison to roll threads on a blank located centrally among them. A patent to Reed 2,367,612 is an example of such a machine. The invention described below is a gauge for a machine of this kind having for its purpose to determine the accuracy of the setting of the rollers or dies. The impression on the work from each die must be continuous with that from each of the others to form a correct thread. The gauge is constructed to show, when assembled in the place to be occupied by the work, whether or not the roller dies are correctly positioned. If not a rotation of one or two of the dies independently of the others quickly changes the relative position of the parts of the gauge until the relation of these parts indicates the correct positional relationship of the rollers whereupon the rollers are locked from independent rotation and the machine is ready for use.

On the drawing:

Fig. 1 is a view in elevation of three rollers or dies with the gauge assembled.

Fig. 2 is a top plan view.

Fig. 3 is a vertical section through two of the dies with the gauge in position. This figure shows the condition of the gauge when the dies are correctly related to each other to roll threads on a workpiece.

Fig. 4 is a similar view showing the parts of the gauge displaced because one of the dies is out of proper relation to the other.

Fig. 5 is a section through the gauge and one of the holding sleeves.

Fig. 6 is a perspective of a part of the gauge.

Referring by reference characters to the drawing, numerals 11, 12 and 13 are the three cylindrical thread rolling dies which constitute a part of the machine for use with which the novel gauge has been designed.

It may be explained that in such machines the shafts carrying the dies 11, 12 and 13 are geared together for simultaneous rotation on their axes, but that the drive connection may be broken to permit independent rotation of each die so that the impression on a centrally positioned blank shall be a continuous unbroken spiral when the rollers are rotated jointly. The machine also has means to effect radial movements of separation of the dies to permit the insertion of the workpiece or the gauge and similar movements of approach to enable the roller dies to grip the workpiece or the gauge when assembled. The structure to accomplish these operations is a part of the machine and is therefore not illustrated.

The gauge is made up of three interfitting and relatively slidable segments 15, 17 and 19. The end portions are reduced as shown at 21. Surrounding each end portion is a sleeve 23 and a screw 25 is passed through each sleeve and is threaded into a single one of the segments. The larger and intermediate part of the segment formed cylinder is accurately threaded as shown at 27, the threads corresponding to the threads which are to be formed in the work. It will be seen from Fig. 6 that the end surfaces of the three segments are coplanar when the threads of the three segments register. The gauge as described and as shown by Fig. 6 is to be inserted centrally relative to the three dies as suggested. If the rotary position of each die is such that its threads are correctly related to the threads of the other dies the assembly will be as appears in Fig. 3 where the end faces of the three segments occupy a single plane. If one or two of the dies are displaced so that they do not match the act of assembly will cause one or two of the segments of the gauge to slide axially as the die threads enter the segment threads and the end faces are no longer coplanar. If a thread were to be rolled on a workpiece with the dies so out of matching relation the thread would, of course, be defective. To correct the fault it is necessary to rotate one or two of the three dies independently until the end surfaces reach a common plane which can be determined by feel, or with an instrument for the purpose, if thought necessary. When the several end faces occupy a common plane each roller die is locked to its driving mechanism. The gauge may be removed and the machine is ready for the work.

Heretofore the test has been made with a marked blank and by cut and try methods. It has required considerable time and repetition of tests to make sure of the accurate positioning of the rollers. With this gauge it is but a matter of a few minutes to insert the gauge, rotate one or more of the dies and the job is done.

We claim:

1. A cylindrical gauge having a plurality of segments assembled for relative axial sliding movements, the external surface of each segment having a portion of a thread, said segments having coplanar ends when the portions of the thread of the segments form a continuous thread around the gauge.

2. The invention defined by claim 1, together with a sleeve surrounding a portion of said segments and fastening means securing said sleeve to one of the segments.

3. A thread gauge having an axis, a plurality of elements assembled about said axis for relative axial sliding movement, the surface of each element having a portion of a thread formed thereon, the elements having means indicating the relative alignment of the portions of the thread on each element.

4. A thread gauge for use with a plurality of cooperating thread rolling dies, comprising a plurality of elements assembled for relative axial sliding movement, the surface of each element having a formation for engaging the surface of each die, indicating means on each element indicating the relative alignment of said formations.

5. A gauge for a thread comprising a plurality of elements assembled about an axis for relative axial sliding movement, the surface of each element having projecting means defining a portion of the maximum diameter of the thread about said axis, indicating means on said elements indicating when said projecting means are in the same helical alignment as the maximum diameter of the thread.

STANLEY E. WEINTHAL.
ERNEST T. BRITCHER.